J. E. Jones,
Pipe Joint.
No. 102,010.      Patented Apr. 19, 1870.
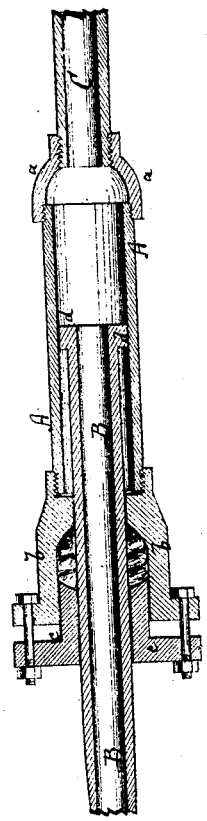
Witnesses
M. Vorlander
Jno. K. Brooks
Inventor
J. E. Jones
per: Munn &
Attorneys

United States Patent Office.

J. EVANS JONES, OF TIDIOUTE, PENNSYLVANIA.

Letters Patent No. 102,010, dated April 19, 1870.

IMPROVEMENT IN EXPANSION JOINTS FOR PIPES.

The Schedule referred to in these Letters Patent and making part of the same.

*To all whom it may concern:*

Be it known that I, J. EVANS JONES, of Tidioute, in the county of Warren and State of Pennsylvania, have invented a new and improved Expansion Joint for Pipes; and I do hereby declare that the following is a full, clear, and exact description thereof, which will enable others skilled in the art to make and use the same, reference being had to the accompanying drawings forming part of this specification, in which the drawing represents a longitudinal section of my improved expansion joint.

The object of this invention is to produce a suitable joint for connecting the ends of pipes, the said joints allowing free expansion and contraction of the pipes during the changes of temperature.

In the oil regions, where pipes are laid to conduct the petroleum as well as for other liquids, an invention of this class is much needed, the devices heretofore proposed for the same purpose being either too expensive or impracticable.

Wherever pipes are laid near to the surface of the ground they are considerably affected by variations of the temperature, and are, in cold weather, often drawn apart at the joints, especially if they are laid in warm weather.

My invention consists in the use of a short piece of pipe, A, larger in diameter than the pieces B C of pipe to be connected, and long enough to allow the requisite degree of expansion and contraction.

A double nut, $a$, connects the pipe C with the pipe A, said nut being contracted at one end, to adapt it to fit the latter.

The other end of the pipe A carries a packing-box, $b$, and a gland, $c$, to form a tight packing around the pipe B. The end of the pipe B is fitted through the packing, and carries within the pipe A a thimble or ring, $d$, which fits into the pipe A as a piston does into a cylinder.

The joint thus produced allows full expansion and contraction of the conducting-pipes, to the extent of play allowed to the thimble $d$ within the pipe B.

The pipe A can also be turned, thereby permitting the pipes B C to be used without being turned.

Having thus described my invention,

I claim as new and desire to secure by Letters Patent—

In combination with the pipe A, the nut $a$, packing-box $b$, and gland $c$, to form joints for the pipes B and C, all constructed and arranged as shown and described.

J. EVANS JONES.

Witnesses:
 WM. T. SCHEIDE,
 E. W. MATTHEWS.